United States Patent [19]

Prince

[11] Patent Number: 5,535,363

[45] Date of Patent: Jul. 9, 1996

[54] METHOD AND APPARATUS FOR SKIPPING A SNOOP PHASE IN SEQUENTIAL ACCESSES BY A PROCESSOR IN A SHARED MULTIPROCESSOR MEMORY SYSTEM

[75] Inventor: Paul E. Prince, Tigard, Oreg.

[73] Assignee: Intel Corporation, Santa Clara, Calif.

[21] Appl. No.: 273,723

[22] Filed: Jul. 12, 1994

[51] Int. Cl.[6] ................................................. G06F 13/14
[52] U.S. Cl. .......................... 395/474; 395/473; 395/477
[58] Field of Search ................................. 395/473, 474, 395/477, 478

[56] References Cited

U.S. PATENT DOCUMENTS

| 5,325,503 | 6/1994 | Stevens et al. | 395/473 |
| 5,404,489 | 4/1995 | Woods et al. | 395/479 |
| 5,408,627 | 4/1995 | Stirk et al. | 395/478 |

Primary Examiner—David L. Robertson
Attorney, Agent, or Firm—Blakely, Sokoloff, Taylor & Zafman

[57] ABSTRACT

A method and apparatus that allows a snoop phase of a memory transaction to be shortened or skipped is described. During processing of a present memory transaction, the ownership of a system bus during previous memory transactions, as well as the data addresses requested for those transactions, are tracked. If the ownership and requested address of the present transaction match those from the previous transaction, a Next Address signal is provided that allows another transaction to proceed before the snoop phase of the present transaction is completed. In alternate embodiments, the ownership and addresses for multiple transactions are tracked and compared with the ownership and addresses of the present transaction. If a match occurs, the Next Address signal is asserted.

20 Claims, 4 Drawing Sheets

_5,535,363_

METHOD AND APPARATUS FOR SKIPPING A SNOOP PHASE IN SEQUENTIAL ACCESSES BY A PROCESSOR IN A SHARED MULTIPROCESSOR MEMORY SYSTEM

BACKGROUND OF THE INVENTION

1. Field of the Invention

The described invention relates generally to the field of computer systems. More particularly, the invention relates to a method and apparatus for controlling the memory system of a computer system that allows the snoop phase of a memory transaction to be skipped if it is known the most current version of data is available.

2. Related Art

Proper operation of a multiprocessor computer system often requires that each microprocessor or other data manipulation device receive the most recent version of any requested data. The process of supplying the most recent version of requested data is called data coherency. One method for achieving data coherency specifies that each device in the computer system capable of local memory storage perform a search, called a "snoop," in response to each data requesting memory transaction initiated by another device. The snoop allows each responding device to determine if it has the most recent version of the data requested and provide the data, or otherwise indicate that the requesting device should cancel or postpone its request when the requested data is not available.

In order to allow each device time to perform a snoop, a snoop phase is normally added to each memory transaction. The snoop phase allows each device time to perform the required search by suspending the present transaction until the location of the most recent version of the data requested is discerned. While this reduces the speed with which a transaction is completed, the importance of maintaining data coherency requires that the snoop be performed nonetheless.

While the use of a snoop phase is usually necessary to maintain data coherency in a multiprocessor computer system, there are some situations in which it can be assured that the most recent version of data being requested is available such that the snoop phase is not necessary. For these situations, it is possible to skip the snoop phase and allow the transaction to proceed immediately. An example of such a situation is two consecutive transaction requests for the same data by the same device. During the second transaction it can be assured that the latest version of the data requested is available, since the latest version of the data will have been located during the first transaction. Despite this known availability, a snoop is nonetheless performed thus reducing the speed of the transaction. While this situation presents a special case, it is especially problematic because many operations and functions call for the same memory location to be manipulated during consecutive transactions. Furthermore, it is commonly the case that the unit of coherency, often called a "cache line", is significantly larger than the minimum data size in a computer system. This causes sequential accesses, several of which fall in the same unit of coherency, to all be subjected to the snoop phase. Therefore, it is desirable to provide a computer system that allows the snoop phase of a transaction to be skipped when the device requesting data in a present transaction has already requested data within the same unit of coherency in an immediately preceding transaction.

BRIEF SUMMARY OF THE INVENTION

The described invention is a method and apparatus that allows a snoop phase of a memory transaction to be shortened or skipped. During processing of a present memory transaction, the ownership of a system bus during previous memory transactions, as well as the data addresses requested for those transactions, are tracked. If the ownership and requested address of the present transaction match those from the previous transaction, a Next Address signal is provided that allows another transaction to proceed before the snoop phase of the present transaction is completed. In alternate embodiments, the ownership and addresses for multiple transactions are tracked and compared with the ownership and addresses of the present transaction. If a match occurs, the Next Address signal is asserted.

DETAILED DESCRIPTION OF THE INVENTION

An apparatus and method for avoiding coherency overhead for sequential accesses in multiprocessor shared memory systems is described in detail. In the following description for purposes of explanation, specific details such as hardware components and their arrangements are set forth to provide a thorough understanding of the present invention. However, the present invention may be practiced without these specific details. In other instances, well known structures, devices, configurations and circuitry are shown in block diagram form. It should be noted that the present invention can be applied to a variety of different processor architectures. Furthermore, the various systems that make up the present invention can be practiced in a variety of manners, such as through the use of hardware and software encoding mechanisms.

Figure 1:
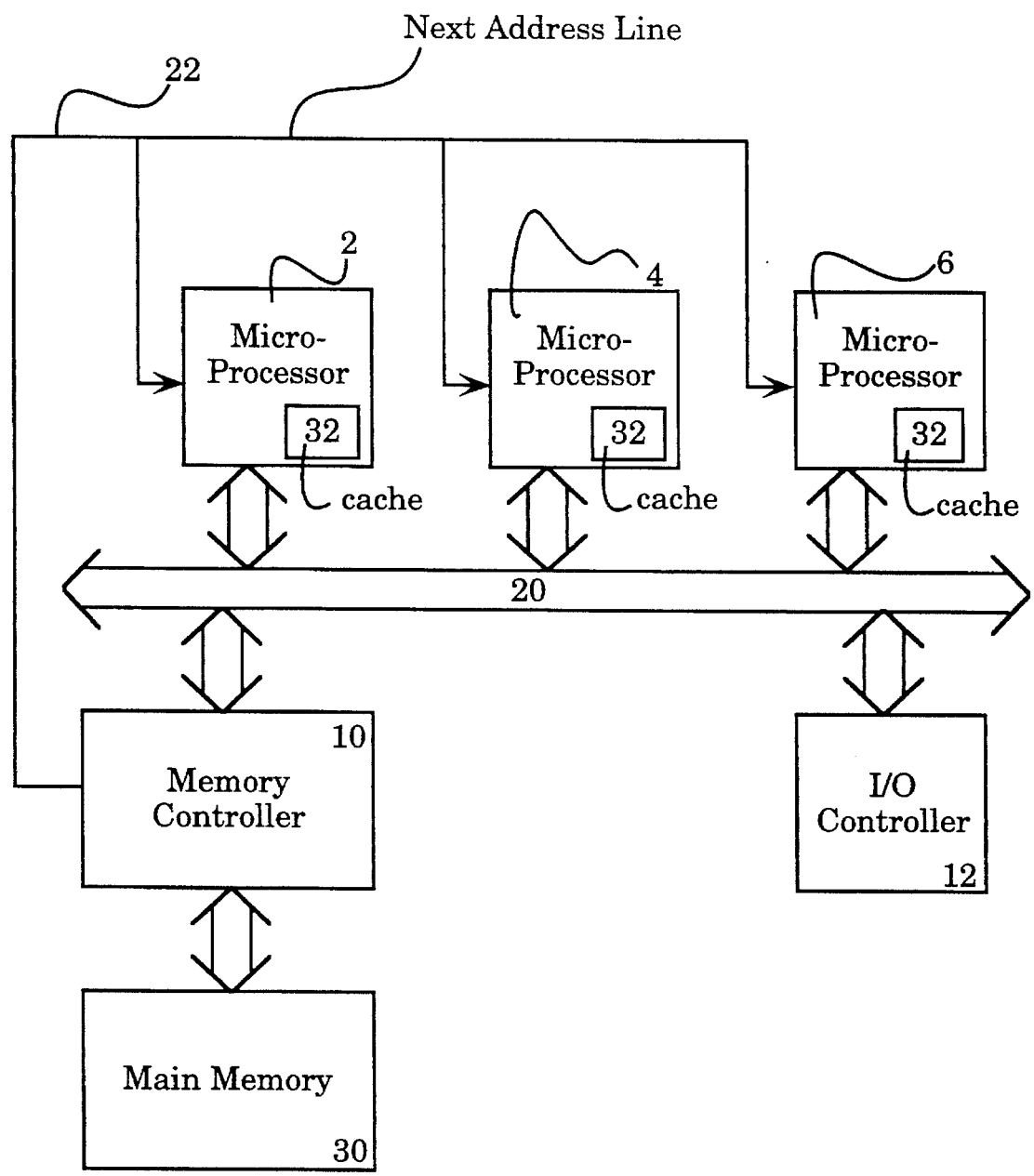
FIG. 1 is a block diagram of a multiprocessor computer system configured in accordance with a first and second embodiment of the invention.

FIG. 1 is a block diagram of a computer system configured in accordance with one embodiment of the invention. Microprocessors 2, 4 and 6, as well as memory controller 10 and input/output ("I/O") controller 12 are coupled to system bus 20. Although three microprocessors are shown, other computer systems using different numbers of microprocessors are consistent with the invention. Memory controller 10 is additionally coupled to microprocessors 2, 4 and 6 through Next Address line 22. While Next Address line 22 is shown separate from system bus 20, it is contemplated that Next Address line 22 could be part of system bus 20. Main memory 30 is coupled to memory controller 10. Each microprocessor contains local cache memory 32 which stores data retrieved from main memory 30 via memory transactions carried out over system bus 20. While a single level of cache memory is shown, the invention is applicable to systems with multiple levels of cache memory.

During an exemplary memory transaction, microprocessor 2 issues a transaction request over system bus 20 that includes an address for the data being requested. After receiving the transaction request, memory controller 10 determines a requesting device ID and the address being requested, and compares these with the requesting device ID and the address requested from the immediately preceding transaction. If the two device ID's are identical, and the address request for the present transaction is within the same unit of coherency as that for the preceding transaction, memory controller 10 will assert a Next Address signal on line 22 allowing the present transaction to complete and a new transaction to be initiated before microprocessors 4 and 6 can complete a snoop that is also performed in response to the original transaction request.

By configuring a computer system in the above-described manner, a new transaction can be initiated before the snoop results of the present transaction are provided, thus decreasing the time necessary for the present transaction to complete. Normally, memory controller 10 would wait until microprocessors 4 and 6 perform a snoop in response to the transaction request from microprocessor 2 before asserting a Next Address signal. However, when the device and address requested for two consecutive transactions are within the same unit of coherency, memory controller 10 asserts the Next Address signal allowing the transaction to proceed, and in some embodiments allowing the other devices to stop performing a snoop. Allowing the transaction to proceed before the snoop results are provided in this situation will not destroy data coherency because the most recent version of that data will have been provided during the previous transaction.

While the situation where two consecutive transactions from the same device manipulate the same coherency unit represents a special case, the total increase in system speed can be substantial because sequential accesses are a very common case. Thus, by recognizing when this special case occurs and asserting a Next Address signal on line 22 in response, the computer system controller configured as shown increases the efficiency with which system bus 20 is utilized. Additionally, since memory controller 10 is often implemented using Application Specific Integrated Circuit ("ASIC") logic, the additional circuitry can be added to the ASIC circuit without requiring additional hardware in the computer system.

Figure 2:
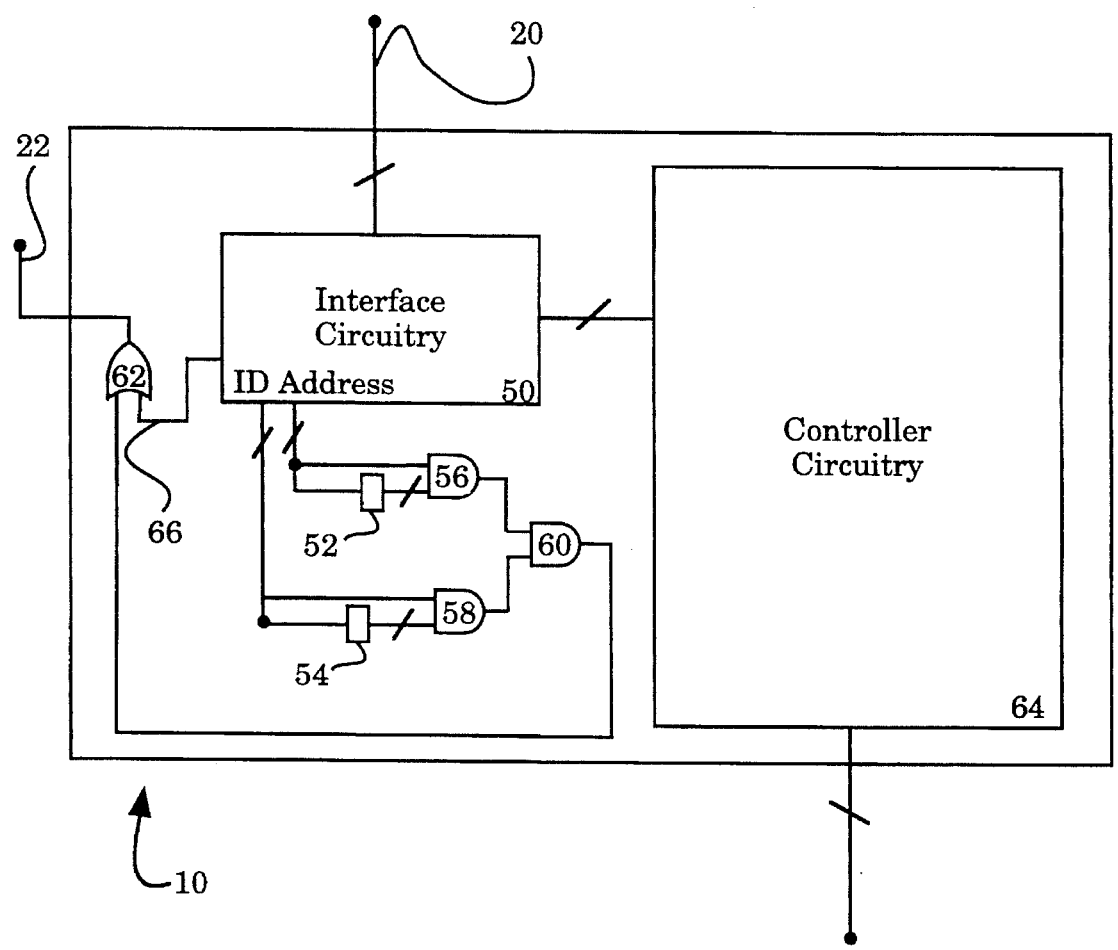
FIG. 2 is a block diagram of a memory controller configured in accordance with the first embodiment of the invention.

FIG. 2 is a block diagram of memory controller 10 configured in accordance with one embodiment of the invention. Controller circuitry 64 performs the memory control function, various implementations for which are well known in the art. System bus 20 is connected to interface circuitry 50 which monitors the various transaction requests made over system bus 20. When a transaction request is received, the data address requested and a device ID of the requesting device is determined. The address and device ID are then transmitted to latch circuits 52 and 54 and AND gates 56 and 58. AND gates 56 and 58 compare the present address and device ID with the address and device ID from an immediately preceding transaction stored by latch circuits 52 and 54. For a system in which the minimum transaction size is smaller than the minimum unit of coherency, a certain portion of the address will be omitted from this comparison. If the results of the two AND operations indicate the values from the present and the previous transaction match, the resulting logic highs are applied to the inputs of AND gate 60 causing a logic high to be applied to OR gate 62, the output of which is used to generate the Next Address signal on line 22.

Figure 3:
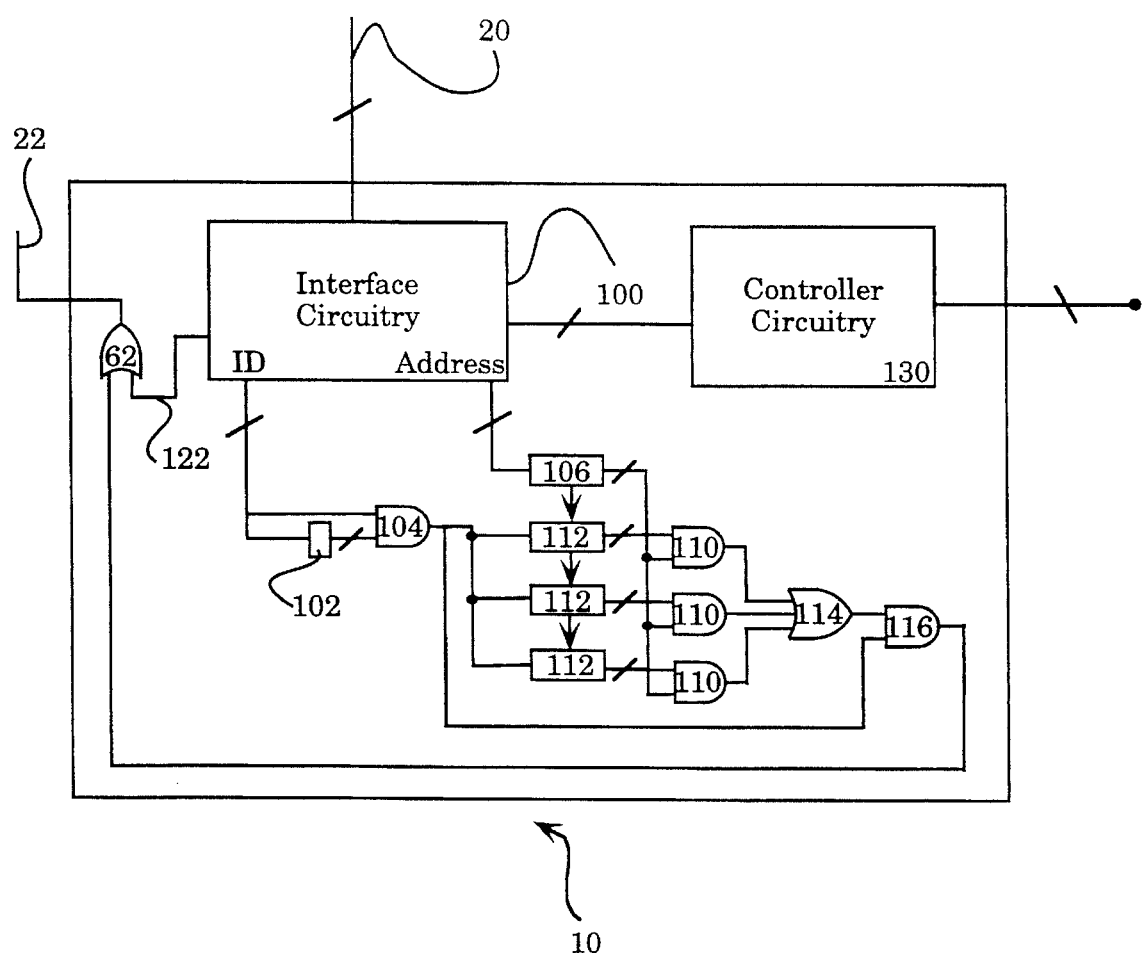
FIG. 3 is a block diagram of the memory controller configured in accordance with the second embodiment of the invention.

FIG. 3 is a block diagram of memory controller 10 configured in accordance with a second embodiment of the invention. Controller circuitry 130 performs the memory controlling function, various implementations for which are well known in the art. Interface circuitry 100 monitors each transaction on system bus 20 and determines the device ID and address requested. The device ID is applied to latch circuit 102 and to AND gate 104, and latch circuit 102 stores the ID once the transaction is complete. The address requested for the present transaction is placed in register 106. The outputs of register 106 and registers 112, which are configured in a stack, are applied to the input of AND gates 110, the outputs of which are applied to OR gate 114. AND gate 116 receives the output of OR gate 114 and AND gate 104. The output of AND gate 116, as well as line 122 from interface circuitry 100 used to assert a Next Address signal when snoop results are necessary, are applied to the inputs of OR gate 62, the output of which is the source of the Next Address signal. The output of AND gate 104 is also applied to register 112. This is used to clear the contents of register 112.

During operation, AND gate 104 asserts a logic high when the device ID of the previous transaction is equal to that of the present transaction. While this logic high remains asserted, the address from previous transactions stored in registers 112 are shifted down after the present transaction has completed and the address stored in register 106 is placed into the register 112 located at the top of the register stack. When a new transaction is requested, the previous addresses stored in registers 112 are compared with the present address stored in register 106 using AND gates 110. If there is a match, one of AND gates 110 applies a logic high to OR gate 114 which in turn applies a logic high to AND gate 116. When a transaction is complete, all the addresses stored in registers 112 are again shifted down, and the address stored in register 106 is placed into the register 112 located at the top of the register stack.

Since AND gate 116 also receives the logic high from AND gate 104, the logic high from OR gate 114 causes it to assert a logic high, which in turn causes OR gate 62 to assert a Next Address signal on line 22. The assertion of the Next Address signal allows the present transaction to proceed before snoop results from the other devices on the bus are provided thus reducing the time it takes to complete the transaction. When a new transaction causes ownership of the bus to change, the device ID for the new transaction is no longer equal to the device ID for the previous transaction and the output of AND gate 104 goes logic low. This logic low clears all registers 112 preventing a match from occurring with the address requested for the new transaction stored in register 106, ensuring that a snoop will be performed during the new transaction.

The configuration of memory controller 10 described above recognizes additional situations where the Next Address signal can be asserted before snoop results are provided, thereby further increasing the overall efficiency with which system bus 20 is utilized. When ownership of system bus 20 has been maintained by a single device for a consecutive series of transactions and the same address is requested twice during that ownership, it can be assured that the most recent version of the requested data is available because no other device has had the opportunity to access the address since it was last requested. It is therefore unnecessary to wait for the snoop results before allowing the present transaction to complete and a new transaction to be initiated. By recognizing these situations, and asserting the Next Address signal when they occur, configuring memory controller 10 in this manner provides increased efficiency.

Figure 4:
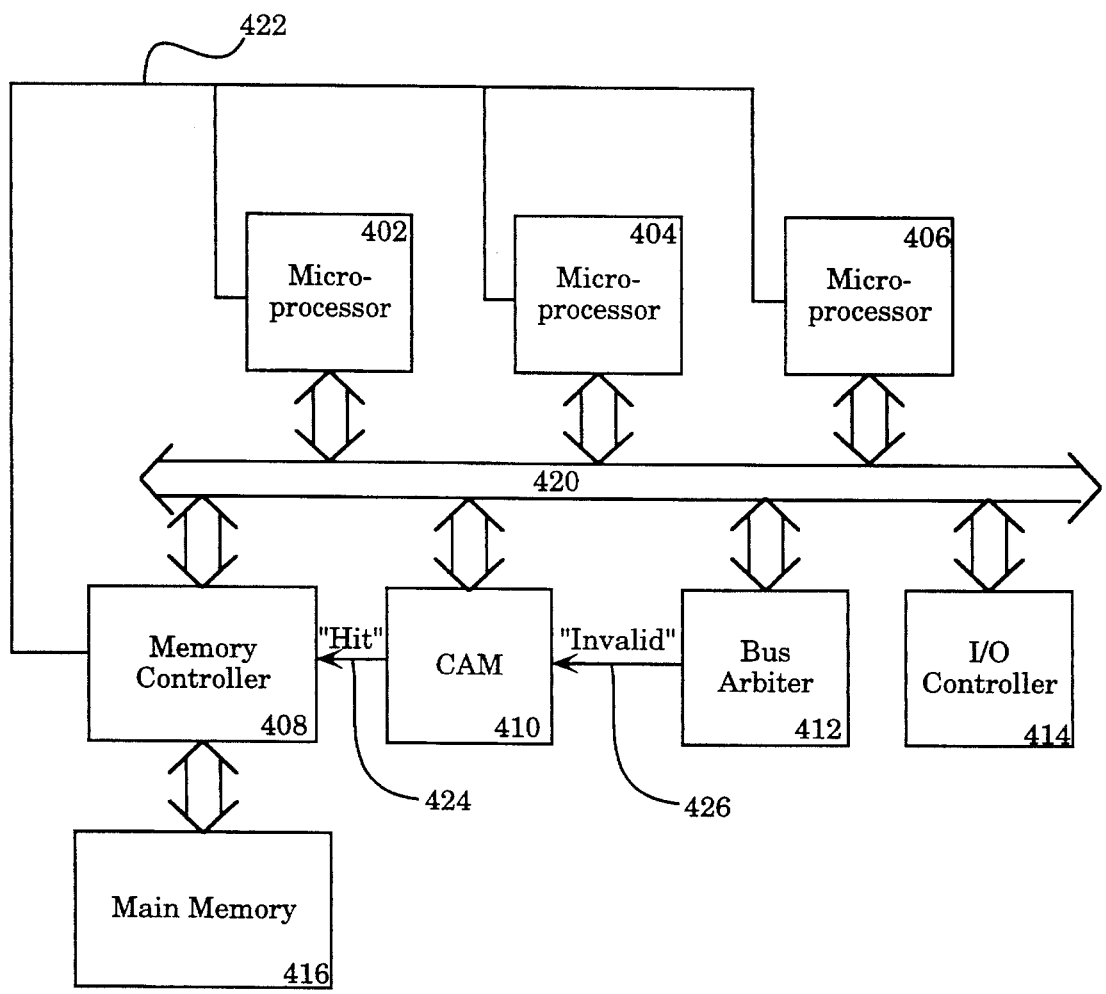
FIG. 4 is a block diagram of an alternative computer system configured in accordance with a third embodiment of the invention.

FIG. 4 is a block diagram of a computer system configured in accordance with a third embodiment of the invention which includes a content addressable memory 410 ("CAM")

and a bus arbiter 412. Microprocessors 402, 404 and 406, memory controller 408, content addressable memory 410, bus arbiter 412 and I/O controller 414 are coupled to system bus 420. Main memory 416 is coupled to memory controller 408 and Next Address line 422 couples microprocessors 402, 404 and 406 to memory controller 408. While Next Address line 422 is shown separate from system bus 420, it is contemplated the Next Address line 422 could be incorporated into system bus 420. Content addressable memory 410 is coupled to memory controller 408 through hit line 424 and bus arbiter 412 is coupled to content addressable memory 410 through Invalid line 426.

The system shown in FIG. 4 incorporates the use of a bus arbitration cycle that allows multiple bus transactions by a single microprocessor within one arbitration window. That is, after a microprocessor has been granted ownership of the bus by bus arbiter 412 it may issue several instructions, one after the other, until the arbitration window is complete. A system incorporating this feature is useful for a variety of reasons including its ability to allow a microprocessor to issue speculative instructions so that it may anticipate the results of various branch operations it performs. During the arbitration window, content addressable memory 410 stores each of the addresses requested on system bus 420 and compares the addresses with the address of present transaction being performed. If the currently requested address is located in content addressable memory 410 indicating it has previously been requested, content addressable memory 410 asserts a Hit signal on line 424 to memory controller 408. When memory controller 408 receives this Hit signal, it asserts a Next Address signal on line 422 indicating that a new transaction request may be performed. This is appropriate because if the address has already been requested it is assured that the most recent version of the data is available. Once the arbitration window has finished, bus arbiter 412 asserts an Invalid signal on line 426 to content addressable memory 410. The Invalid signal causes content addressable memory 410 to invalidate all addresses that it has stored. Thus, when the next transaction begins content addressable memory 410 will not assert a hit thereby assuring that a snoop will be performed to locate the latest version of any data requested.

Thus, a computer system that avoids coherency overhead during sequential accesses in a multiprocessor system has been described. Various embodiments of the invention are possible other than these disclosed. In general, the exemplary embodiments described herein are merely illustrative of the invention and should not be taken as limiting the scope of the invention.

What is claimed is:

1. A computer system comprising:

a system bus;

a plurality of microprocessors coupled to said system bus, said plurality of microprocessors including a first microprocessor that generates successive transaction requests including a first transaction request having a first device ID and a first address followed by a second transaction request having a second device ID and a second address;

a first storage element which contains said first device ID and said first address;

a first comparator circuit coupled to said first storage element, said first comparator circuit provides a positive result when said second device ID equals said first device ID and said second address equals said first address; and a driver circuit coupled to said first comparator circuit, said driver circuit provides a signal indicating to said plurality of microprocessors that said second transaction request may proceed without waiting for a snoop to be performed if said first comparator circuit provides said positive result.

2. The computer system set forth in claim 1 wherein:

said first transaction request and said second transaction request are requested consecutively.

3. The computer system set forth in claim 2 further comprising:

a second storage element which contains a third device ID and a third address from a third transaction request on said system bus, said third transaction request being generated prior to said first and second transaction requests; and a second comparator circuit coupled to said second storage element, said second comparator circuit provides a positive result when said second address equals said third address if said third device ID equals said first device ID and said second device ID.

4. The computer system set forth in claim 3 wherein:

said driver circuit provides a signal indicating that said second transaction may proceed without waiting for said snoop to be performed if said first comparator circuit or said second comparator circuit provides a positive result.

5. A method for maintaining data coherency in a multiprocessor computer system comprising the steps of:

a) requesting on a system bus a first transaction having a first device ID and a first address;

b) storing said first device ID and said first address;

c) requesting on said system bus a second transaction having a second device ID and a second address;

d) generating a positive result when said second device ID equals said first device ID and said second address equals said first address;

e) indicating that said second transaction may proceed without waiting for a snoop to be performed if step d) provides a positive result.

6. The method set forth in claim 5 further comprising the step of:

storing a third device ID and a third address from a third transaction request made on said system bus, said first transaction request is requested consecutively to said third transaction request.

7. The method set forth in claim 6 wherein step c) further comprises:

comparing said second address with said third address if said third device ID equals said first device ID and said second device ID.

8. The method set forth in claim 7 wherein step d) comprises the step of:

indicating that said second transaction may proceed without waiting for said snoop to be performed if step c) provides said positive result.

9. A computer system comprising:

means for generating on a system bus successive transaction requests including a first transaction request having a first device ID and a first address followed by a second transaction request having a second device ID and a second address;

means for storing said first device ID and said first address;

first means for providing a positive result when said second device ID equals said first device ID and said second address equals said first address; and means for indicating that said second transaction request may proceed without waiting for a snoop to be performed if said first means for providing provides said positive result.

10. The computer system set forth in claim 9 wherein:

said first transaction request and said second transaction request are generated consecutively.

11. The computer system set forth in claim 10 further comprising:

means for storing a third device ID and a third address from a third transaction request generated on said system bus by said means for generating, said first transaction requested after and consecutive to said third transaction; and second means for providing said positive result when said second address equals said third address if said third device ID equals said first device ID and said second device ID.

12. The computer system set forth in claim 11 wherein:

said means for indicating indicates that said second transaction may proceed without waiting for said snoop to be performed if either said first means for providing or said second means for providing indicates said positive result.

13. A controller controlling a plurality of microprocessors, the controller comprising:

an interface circuit which receives successive transaction requests and performs a snoop after each transaction request, said transaction requests include a first transaction request having a first device ID and a first address followed by a second transaction request having a second device ID and a second address;

a first storage element coupled to said interface circuit, said first storage element receives and temporarily contains said first device ID and said first address;

a first comparator circuit coupled to said first storage element, said first comparator circuit provides a positive result when said second device ID equals said first device ID and said second address equals said first address; and a driver circuit coupled to said first comparator circuit, said driver circuit provides a signal which indicates to the plurality of microprocessors that said second transaction request may proceed without waiting for said snoop to be performed if said first comparator circuit provides said positive result.

14. The controller set forth in claim 13 wherein:

said first transaction request and said second transaction request are requested consecutively.

15. The controller set forth in claim 14 further comprising:

a second storage element coupled to said interface circuit, said second storage element receives and temporarily contains a third device ID and a third address from a third transaction request, said third transaction request being received prior to said first and second transaction requests; and a second comparator circuit coupled to said second storage element, said second comparator circuit provides a positive result when said second address equals said third address if said third device ID equals said first device ID and said second device ID.

16. The controller set forth in claim 15 wherein:

said driver circuit provides a signal to the plurality of microprocessors indicating that said second transaction may proceed without waiting for said snoop to be performed if at least one of said first comparator circuit and said second comparator circuit provides a positive result.

17. A controller controlling a plurality of microprocessors, the controller comprising:

means for receiving successive transaction requests and for performing a snoop after each of said transaction requests, said transaction requests include at least a first transaction request having a first device ID and a first address followed by a second transaction request having a second device ID and a second address;

first means for receiving and temporarily containing said first device ID and said first address;

first comparison means for providing a positive result when said second device ID equals said first device ID and said second address equals said first address; and means for outputting a signal to the plurality of microprocessors to indicate that said second transaction request may proceed without waiting for said snoop to be performed if said first comparison means provides said positive result.

18. The controller set forth in claim 17 wherein:

said first transaction request and said second transaction request are requested consecutively.

19. The controller set forth in claim 18 further comprising:

second means for receiving and temporarily containing a third device ID and a third address from a third transaction request, said third transaction request being received prior to said first and second transaction requests; and second comparison means for providing a positive result when said second address equals said third address if said third device ID equals said first device ID and said second device ID.

20. The controller set forth in claim 19 wherein:

said means for outputting provides a signal to the plurality of microprocessors indicating that said second transaction may proceed without waiting for said snoop to be performed if at least one of said first comparison means and said second comparison means provides a positive result.

\* \* \* \* \*